A. BELER.
REGULATING VALVE FOR WATER HEATERS.
APPLICATION FILED OCT. 7, 1916.

1,265,593.

Patented May 7, 1918.
2 SHEETS—SHEET 1.

Witnesses

Adolf Beler
Inventor,
by
Attorneys.

A. BELER.
REGULATING VALVE FOR WATER HEATERS.
APPLICATION FILED OCT. 7, 1916.

1,265,593.

Patented May 7, 1918.
2 SHEETS—SHEET 2.

Witnesses

Inventor,
Adolf Beler
by
Attorneys.

UNITED STATES PATENT OFFICE.

ADOLF BELER, OF PITTSBURGH, PENNSYLVANIA.

REGULATING-VALVE FOR WATER-HEATERS.

1,265,593.  Specification of Letters Patent.  Patented May 7, 1918.

Application filed October 7, 1916. Serial No. 124,346.

*To all whom it may concern:*

Be it known that I, ADOLF BELER, a citizen of the United States, residing at Pittsburgh, in the county of Allegheny and State of Pennsylvania, have invented a new and useful Regulating-Valve for Water-Heaters, of which the following is a specification.

This invention relates to regulating valves for use in connection with water heaters.

Heretofore it has been the practice to use, in connection with instantaneous water heaters, a pressure operated valve adapted to be actuated when water is drawn off at the point of consumption, thereby to operate a gas controlling valve so that the gas will be turned on and the water quickly heated. While a structure such as described has usually been found efficient, there have been times when the pressure operated valve has not properly worked and, consequently, the gas has not always been turned off automatically when the flow of water from the heater has ceased. Consequently steam has often been generated in the heater with the result that explosions have occurred, wrecking the heating apparatus and endangering the lives of persons nearby.

One of the objects of the present invention is to provide means for automatically controlling the flow of gas to the burner of an instantaneous heater without depending on a pressure controlled valve but, instead, depending on a thermostatically controlled valve and which valve will open automatically when fresh cold water is directed into its controlling thermostat as a result of the opening of the faucet or other outlet valve connected to the heater.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1:
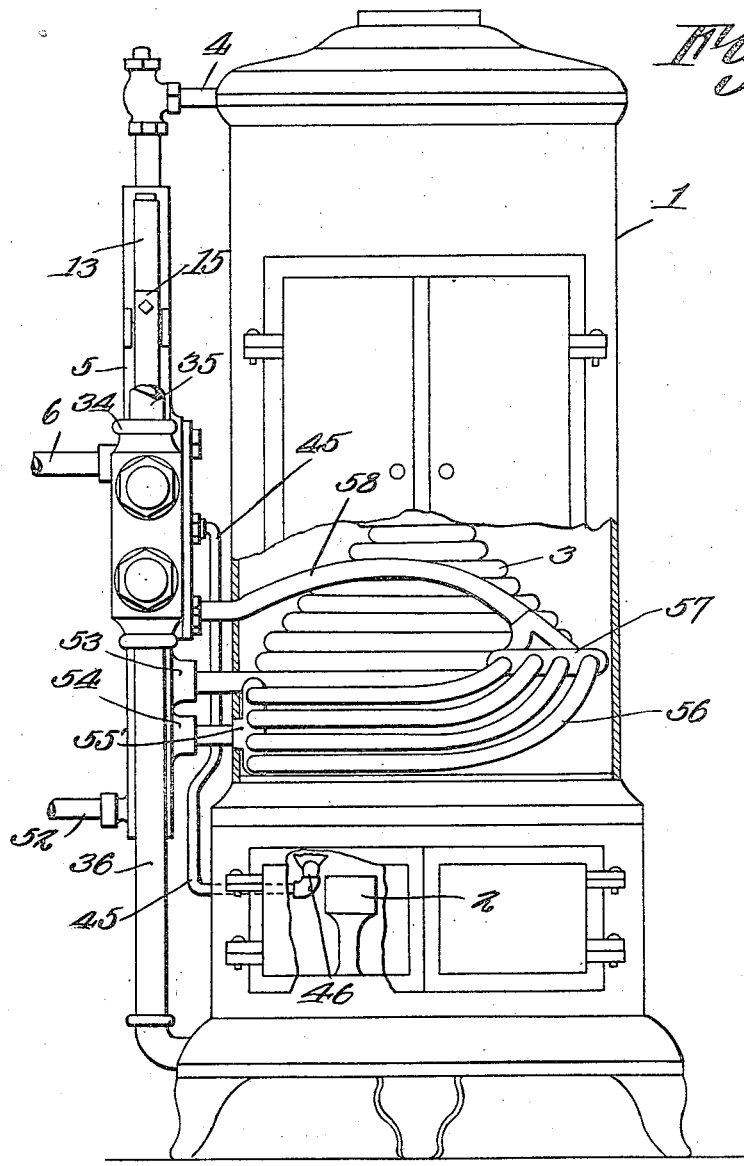
Figure 1 is an elevation of an instantaneous water heater embodying the present improvements, a portion thereof being broken away.
Figure 2:
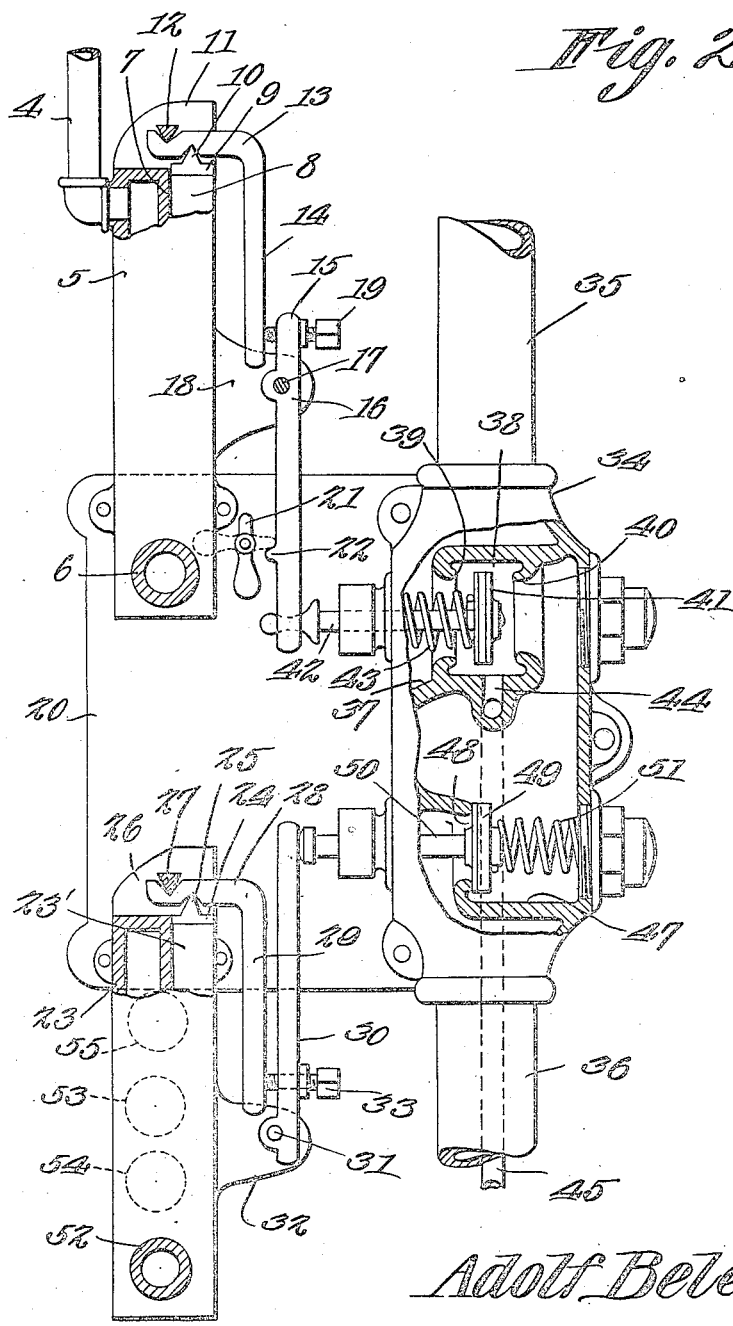
Fig. 2 is an enlarged view partly in section and partly in elevation of the thermostatically controlled valves.

Referring to the figures by characters of reference 1 designates the casing of the heater, there being a suitable arrangement of burners 2 in the lower portion thereof whereby the coil 3 may be quickly heated. The upper convolution of the coil is connected by a pipe 4 to the upper end of a hollow thermostat member 5 from the lower end of which extends an outflow pipe 6. This hollow thermostat member has a high coefficient of expansion and is provided with a longitudinal recess 7 in which is loosely mounted a rod 8 of porcelain or other material having a low coefficient of expansion. This rod or thermostat member 8 has an extension 9 at its upper end provided with a knife edge 10 and said extension projects between upstanding wings 11 on the thermostat member 5 and which wings are connected by a knife edge 12. Bearing downwardly on the knife edge 10 is a lever 13 and this lever also extends under and engages the knife edge 12, suitable notches being provided in the lever for the reception of the respective knife edges as shown in Fig. 2. Lever 13 extends substantially horizontally from the thermostat and is then bent downwardly to form an arm 14 and this arm extends back of the upper short arm 15 of an intermediate lever 16 which is preferably fulcrumed, as at 17, between ears 18 outstanding from the thermostat member 5. An adjusting screw 19 is carried by the short arm 15 of this intermediate lever and engages the arm 14 of the lever 13.

The thermostat member 5 is preferably secured to a supporting plate 20 and on this plate is pivotally mounted a weighted latch 21 located between the thermostat member 5 and the intermediate lever 16. This lever has a lug 22 extending therefrom toward the latch and constitutes a stop for the latch when said latch is shifted to holding position as hereinafter described.

Suitably connected to the plate 20 is another hollow thermostat member 23 having a high coefficient of expansion and loosely connected to the thermostat member is a rod 23' of porcelain or other material having a low coefficient of expansion. This thermostat member or rod 23' has an extension 24 provided with a knife edge 25 and the thermostat member 23 has upwardly extending wings 26 connected by a knife edge 27. A lever 28 is extended over the knife edge 25 and under the knife edge 27 and is provided with notches for the reception of the respective knife edges. This lever extends beyond the thermostat member and is bent to form a downwardly extending arm 29. An intermediate lever 30 is pivotally mounted as at 31 between ears 32 outstanding from the thermostat member 23 and this lever has an adjusting screw 33 located close to its fulcrum and engaging the arm 29. Lever 30 is extended toward the lever 16 and is a lever of the third class, while lever 16 is a lever of the first class.

Secured preferably to the plate 20 is a valve casing 34 having a fuel supply pipe 35 opening into one end thereof and a fuel outflow pipe 36 extending from the other end thereof. A partition 37 is extended across the upper portion of the valve casing 34 and is provided with a gas port 38 having opposed valve seats 39 and 40 extending toward each other. Interposed between these valve seats is a valve 41 from which projects a stem 42 which is slidably mounted in the wall of casing 34 and is engaged and adapted to be actuated by the lower end of the lever 16. A spring 43 is mounted on the stem 42 and operates to hold valve 41 normally pressed toward the seat 40, although it is to be understood that when the valve is moved against the action of its spring it can be brought onto the seat 39. When the valve is in either of these positions the flow of fuel from the pipe 35 into the lower portion of the casing 34 will be stopped.

A vent 44 opens into the port 38 between the seats 40 and 39 and communicates with a pipe 45 which extends to a pilot burner 46. Thus it will be seen that when valve 41 engages its seat 39, the flow of gas to the pilot burner is cut off, whereas when the valve 41 engages the seat 40, the flow of gas to the pilot may continue although the flow of gas to the lower portion of the casing 34 is cut off.

A partition 47 is arranged in the lower portion of the casing 34 and is provided with a port 48 adapted to be closed by a valve 49. This valve has a stem 50 slidably mounted in the wall of the casing 34 and normally contacting with the upper end of the lever 30. A spring 51 is arranged in the casing and constitutes means for pressing the valve 49 yieldingly onto its seat.

Opening into the lower portion of the hollow thermostat member 23 is a water supply pipe 52 and opening into the hollow thermostat member 23 at a point near the center thereof is the lower convolution of the coil 3, the port in communication with said convolution being indicated by dotted lines at 53. Additional ports 54 and 55 are formed in the hollow thermostat member 23 near the lower and upper ends thereof. Communicating with the port 54 is a manifold 55' connected through a series of tubes 56 with another manifold 57 which, in turn, is connected by a tube 58 to the port 55. The pilot burner 46 is located not only adjacent one of the burners 2 but also under the tubes 56 so that as long as fuel is being consumed at the burner 46, the water contained in the tubes 56 will be heated slightly above the normal temperature thereof and a circulation will thus be established through the tubes 56 and 58 and the hollow thermostat member 23. As long as this circulation is taking place, the thermostat member 23 will be held expanded and knife edge 27 will be elevated relative to knife edge 25 with the result that arm 29 will offer no resistance to lever 30 and, consequently, spring 51 will hold the valve 49 onto its seat, thus preventing the flow of gas to the burners 2. The waste heat will also tend to maintain the contents of the coil 3 at a slightly raised temperature and, therefore, the knife edge 12 will be held away from the knife edge 10 and spring 43 will be free to hold valve 41 away from its seat 39 but not in contact with the seat 40. Therefore gas will be free to flow to the pilot burner and also into the lower portion of the casing 34 but will be stopped by the valve 49 from flowing into the pipe 36. When it is desired to remove hot water from the apparatus the faucet connected to the pipe 6 is opened and a circulation of fresh water is immediately set up through pipe 52 into the thermostat member 23 and thence through port 53 into the coil 3 from which it will flow outwardly through pipe 4 into the thermostat member 5 and thence into the pipe 6 to the faucet. As soon as the cold water enters the thermostat member 23, said member will be caused to contract so that knife edge 27 will pull downwardly on lever 28 and cause the arm 29 to press against the screw 33. Consequently lever 30 will thrust against the stem 50 and unseat the valve 49. Therefore gas will be free to flow to the burners 2 where it will be ignited by the pilot flame. As long as cold water is entering the thermostat member 23 due to the outflow of water at the faucet, valve 49 will be maintained in open position. However, as soon as the flow of water is stopped, a circulation of hot water through the member 23 and the tubes 56 and 58 will begin and, consequently, the thermostat members 23 and 23' will shift relative to each other so as to permit spring 51 to reseat the valve 49 and shut off the flow of gas to the burners 2. During the outflow of water from the apparatus the heated water leaving the coil passes through the thermostat member 5 and thus causes the knife edge 12 to move upwardly relative to the knife edge 10 with the result that valve 41 will be shifted under the action of its spring 43 toward seat 40, thus to partly cut off the flow of gas and thereby reduce the size of the flame at the burners 2. This automatic shifting of valve 41 will maintain the temperature of the water uniform. If, at any time, the flames at the burner 2 and also at the pilot 46 should be extinguished accidentally, then the thermostat member 5 would contract below the normal degree of contraction and would cause arm 14 to thrust against the upper arm of lever 15 thereby to pull valve 41 against its seat 39 and cut off the flow of gas not only to the pipe 36 but also to the pilot. When it is desired to start the apparatus after valve 41 has been moved to its seat 39, it is necessary first to press lever 16 toward the casing 34 to move valve 41 away from seat 39. This movement of lever 16 can be effected by turning latch 21 until the point of the latch comes against the stop lug 22 as shown by dotted lines in Fig. 2. The pressure of the lever against the latch will be sufficient to hold it frictionally. This slight displacement of the valve will be ample to allow the gas to flow into the pipe 45 and to the pilot so that the fuel can be ignited at the pilot burner and, as the water in the coil 3 becomes slightly tempered by the heat ascending from the pilot burner, the lever 13 will be shifted and allow lever 16 to move under the action of the spring 43 so that the latch 21 will be ultimately released and will gravitate to its normal position. The shifting of lever 16 by the latch 21 to open valve 41 is permitted by having lever 16 slightly resilient or by rotating screw 19 to permit a slight movement of the lever about its pivot.

It will be apparent that by providing valve controlling means such as described, it becomes unnecessary to use any reciprocating or other valves operated by fluid under pressure and which valves, as before stated, often become caught so as to interfere with the proper operation of the mechanism. Instead the operation of the gas valves is dependent entirely upon the temperature of the water flowing to and through the apparatus.

What is claimed is:—

1. A water heater comprising a burner, a fuel conduit including a valve casing leading to the burner, an inlet valve in the casing, there being seats between which the valve oscillates, an outlet valve in the casing, a water heating coil, thermostatic means through which the water passes to the intake of said coil for operating the outlet valve to supply fuel to the burner, and independent thermostatic means for oscillating the inlet valve between its seats to regulate the supply of fuel to the burner.

2. A water heater, comprising a burner, and a pilot burner associated therewith, a fuel conduit including a valve casing leading to the burner, an inlet valve in the casing, there being seats between which the valve normally stands, an outlet valve in the casing, a water heating coil, thermostatic means through which the water passes to the intake of said coil for operating the outlet valve to supply fuel to the burner, and independent thermostatic means for forcing the inlet valve against one seat to cut off the fuel from the burner or allowing the valve to contact the other seat to cut fuel off from the burner and pilot.

In testimony that I claim the foregoing as my own, I have hereto affixed my signature in the presence of two witnesses.

ADOLF BELER.

Witnesses:
 R. A. Troop,
 Fred B. Fisher.